Aug. 26, 1941.                W. MELODY                2,253,938
                     CONFECTIONERY MOLDING MACHINE
                         Filed Oct. 1, 1937        3 Sheets-Sheet 1
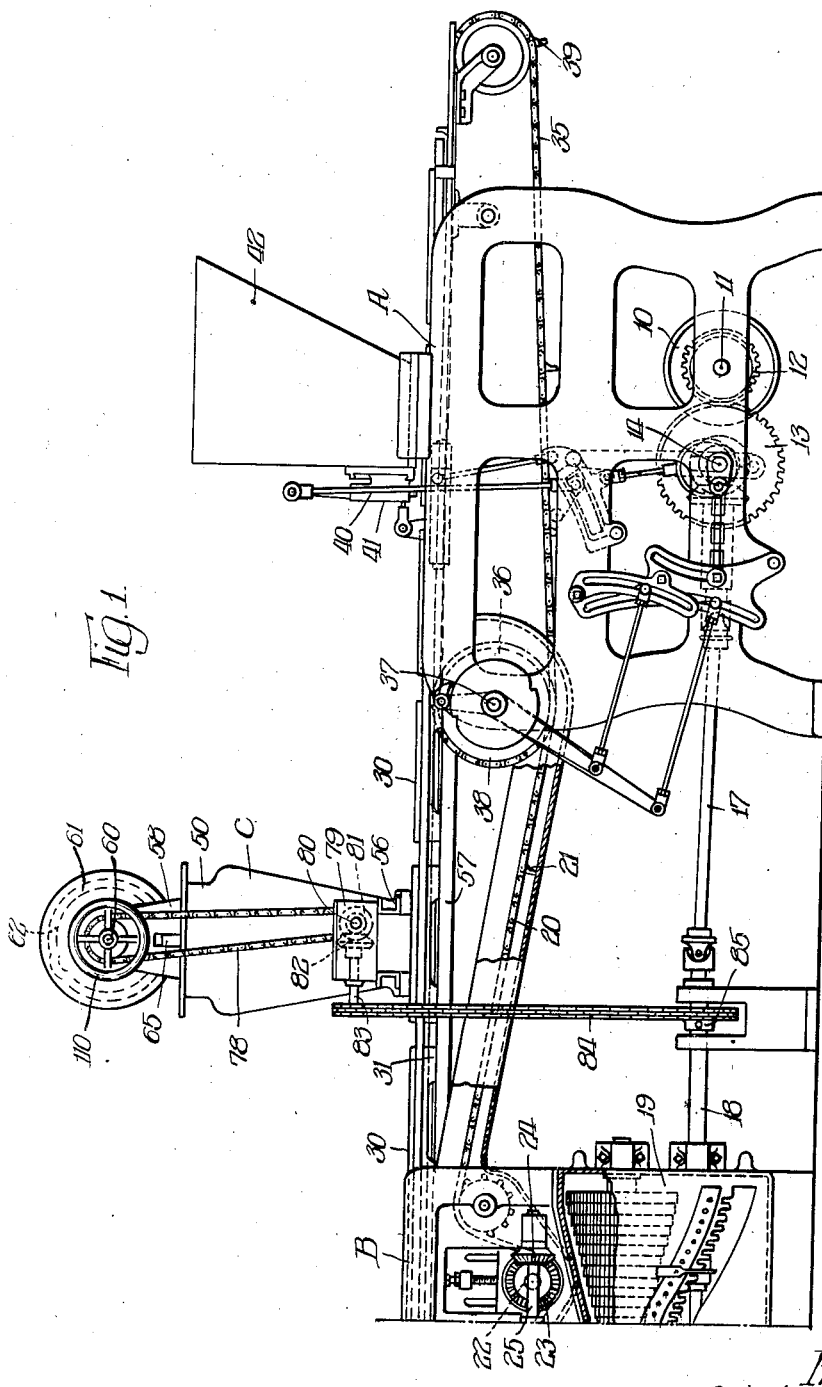
Inventor:
William Melody.
By Wilkinson, Huxley, Byron & Knight
                                    attys Aug. 26, 1941.  W. MELODY  2,253,938
CONFECTIONERY MOLDING MACHINE
Filed Oct. 1, 1937  3 Sheets-Sheet 2
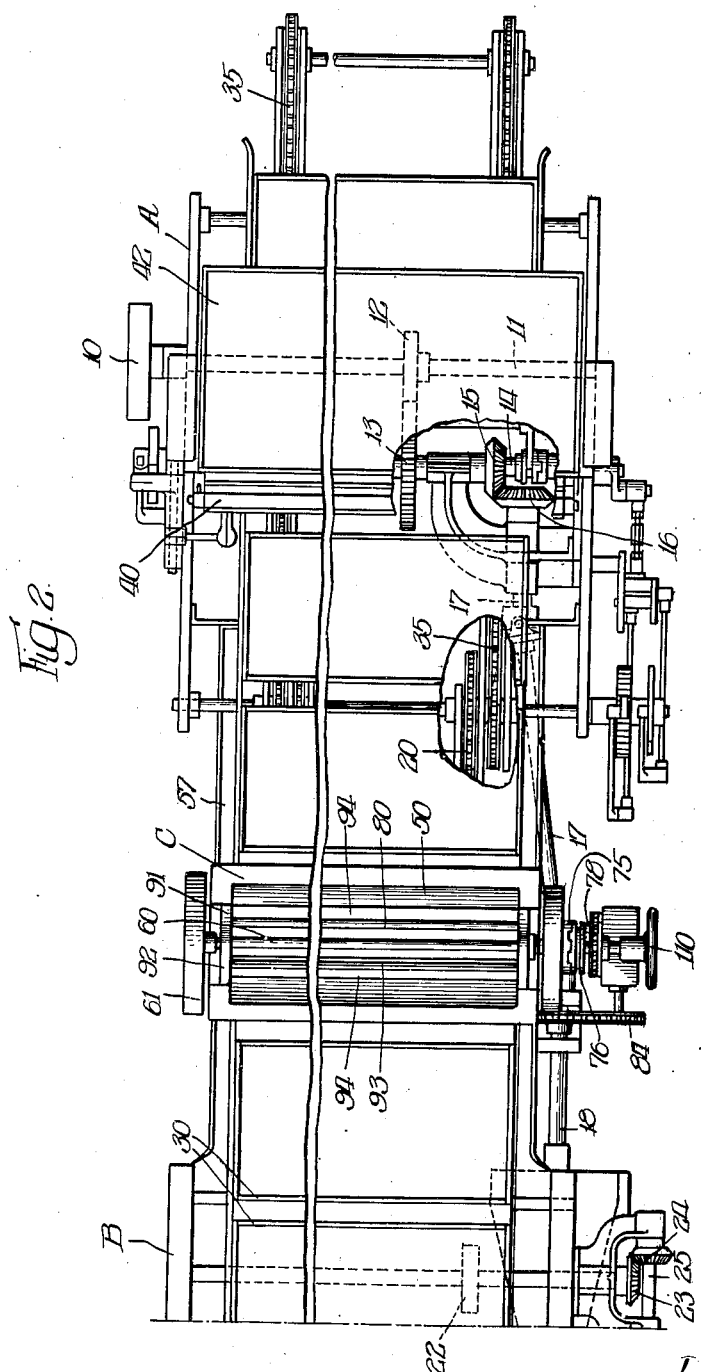
Inventor:
William Melody
By Wilkinson, Huxley, Byron & Knight
Attys Aug. 26, 1941.  W. MELODY  2,253,938
CONFECTIONERY MOLDING MACHINE
Filed Oct. 1, 1937  3 Sheets-Sheet 3
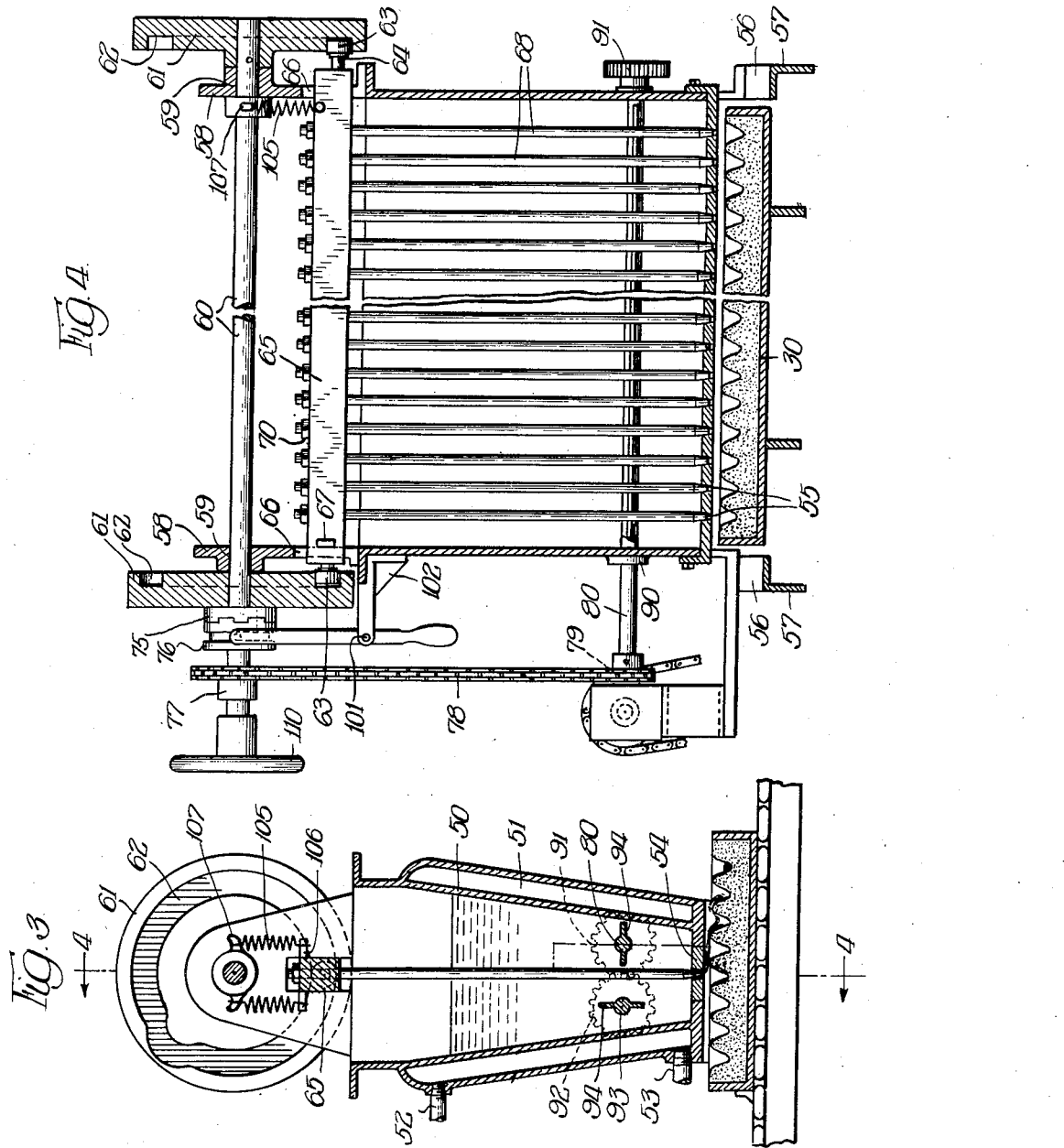
Inventor:
William Melody,
By Wilkinson, Huxley, Byron & Knight
Attys.

Patented Aug. 26, 1941

2,253,938

UNITED STATES PATENT OFFICE 2,253,938

CONFECTIONERY MOLDING MACHINE

William Melody, Chicago, Ill., assignor to E. J. Brach & Sons, Chicago, Ill., a corporation of Illinois Application October 1, 1937, Serial No. 166,712

6 Claims. (Cl. 107—3)

This invention relates to machines for automatically molding confectionery and more particularly comprises an improvement in the type of machine described and illustrated in United States Letters Patent No. 1,169,602, issued January 25, 1916, to A. L. Bausman.

In machines of this type means are provided for successively filling a series of trays with starch, levelling off the surface thereof, impressing a series of candy forming recesses or pockets in the starch of the desired size and shape and for conveying the trays successively through the various stages of these operations. Means are also included for automatically conveying the trays to the location of one or more depositing devices which deposit measured quantities of confectionery into the recesses or pockets formed in the trays of starch. The candy forming operation involves hardening of the deposited candy, subsequent removal from the trays and if desired the returning of trays and starch to the machinery for reuse in a repetition of the steps above outlined.

Machines of the above described type are now in common use for molding various types of confections and it is found that the confectionery depositors employed are satisfactory in those cases where the amount of confection deposited is sufficiently large to constitute a measurable and segregatable drop or globule which will fall in the desired manner into the starch recesses. Confectionery so deposited is usually in a viscous, syrupy, flowable form whereby measuring chambers and discharging plungers may be utilized to eject predetermined quantities of the confection at such positions as to properly fall into the starch recesses.

The conveying mechanism for machines of this type usually convey the starch trays intermittently through the tray preparation operations, and are so adjusted as to advance a distance of one tray and then stop. In this way the trays are successively presented to the various stations where the tray preparing operations are automatically performed.

Upon completing the preparation of the starch trays, they are usually intermittently advanced by another conveyor beneath one or more confectionery depositing mechanisms but in this instant the trays move forwardly a much shorter distance, namely, the distance between adjacent rows of confectionery recesses or pockets in the trays of starch rather than the distance of one complete tray. In this way the successive transverse rows of confectionery recesses or pockets in the starch come successively under the depositing mechanism and stop for a period sufficient to receive a predetermined and measured deposit of confection, after which the trays are again moved forwardly a distance sufficient to bring the next succeeding transverse row of recesses beneath the depositing mechanism where they again come to rest so that this transverse row may receive a measured deposit of confection, and so on.

It will thus be seen that the first portion of the operation serves to prepare the trays and requires an intermittent advancement of the trays an amount equal to the length of each tray whereas subsequently at the location of the confectionery depositor or depositors, the deposition of confection in successive transverse rows of starch pockets requires an intermittent movement of the trays a very much smaller distance equal only to the space between adjacent transverse rows of recesses or pockets in the starch trays.

Whereas the above described machines are very successful when used for depositing confection in each pocket of not less than a certain predetermined amount, such machines have not been successfully used to deposit minute quantities of confection and consequently in cases where such small depositions of confection were desired, such depositions were either avoided heretofore or were made by hand. This limitation is due to the fact that it has been found to be extremely difficult to devise depositors which will segregate and discharge such minute quantities of confection referred to.

Certain types of candy are now on the market which are composite in form and are made up of various separate quantities of a plurality of different kinds of confection. These separate portions are sometimes of different flavor and sometimes of different color, or both, but whatever the difference, their manufacture requires that they be deposited separately from different sources of supply. As an example of this type of candy may be mentioned a popular confection on the market made in imitation of kernels of corn. This confection is usually composed of three different colors with the result that the tip of the corn kernel is white, the middle section is yellow, and the base is a reddish orange. This combination of colors has been selected to provide an appearance in relatively close imitation of real corn kernels. Its manufacture requires that the white tip be quite small and as found in practice, such tips require only an amount of confection which is too small successfully to deposit automatically by machinery available prior to this invention. In consequence, a three colored corn confection has been difficult and expensive to produce and has required an initial hand operation for depositing the white tip.

Obviously, other forms of confection may involve this or similar problems, and accordingly, it is an object of this invention to provide a machine which is entirely automatic and which constitutes an improvement in machinery of the type above referred to and now commonly employed in the confection industry and yet which will serve to deposit a limited and predetermined quantity of confection in the successive transverse rows of starch recesses or pockets, and which limited quantities are smaller than have been possible automatically to deposit prior to this invention.

In carrying out the above stated object, this invention provides means for automatically and continuously feeding under a new and improved depositor, trays having successive transverse rows of confection receiving recesses therein, at a uniform rate and while the depositors are open for the continuous discharge of confection during the entire period that the tray is moving therebeneath, that is, from the time that the first transverse row of recesses occupies the position below the depositors until the last transverse row of the particular tray is positioned below the depositors and has received a portion of the deposited confection therefrom.

The mechanism involved is designed to continuously feed confection at a predetermined rate based upon the desired results and determined by the speed of the movement of the trays so that a ribbon or rope of confection is deposited above each longitudinal row of recesses. The longitudinal rows which lie in the direction of the movement of the trays should be distinguished from the transverse rows of recesses. The invention further involves the formation of candy forming recesses or pockets sufficiently close together in the longitudinal direction to cause the ribbon or rope of confection deposited to be supported on a series of rather narrow edges located at spaced points between adjacent recesses, with the result that the portions of the ribbon or rope which overlie each recess, due to the viscosity and flowability of the confection, will tend to sag and form a drop with the further result that the successive drops will become severed one from the other in a manner to cause each segregated portion or drop to fall into its particular recess or pocket.

It has been found that this method of adjusting the rate of deposit along the successive recesses of a longitudinal row contained in a continuously moving tray will enable the production of the desired results, namely, the deposition of the desired limited quantity of confection including quantities which are too small for measurement and ejectment by use of the usual confectionery depositing mechanism.

Accordingly this invention constitutes an improvement on the type of machinery above referred to and described and illustrated in the Bausman Patent No. 1,169,602 and involves the addition thereto of a novel depositor of a type hereinafter more fully described associated with that portion of the tray conveyor which moves continuously for at least the full length of the tray whereby the tray may be caused to pass without interruption under the novel depositor of this invention.

The invention further involves the use of a plurality of feeding openings in the depositor, controlled plungers which are adjustable to determine the rate of feed of the confection contained therein and means for raising and lowering the plunger in timed and synchronised relation to the advancements of the trays beneath the depositing mechanism. Thus, by simply adjusting the depositing mechanism and selecting the rate of feed of the trays beneath the depositors according to the rate of feed of the confection from the depositing openings a ribbon or rope of desired size may be deposited along the various longitudinal rows of confection forming recesses. Upon segregation of the ribbon or rope into drops the desired and intended quantity will fall into the bottom of each of the separate recesses.

Reference will now be made to the accompanying drawings which illustrate one embodiment of the invention and in which—

Figure 1 is a side elevational view of a portion of a machine of the type illustrated in the Bausman Patent No. 1,169,602 above referred to but modified and improved to include the features constituting this invention;

Figure 2 is a plan view of the machine illustrated in Figure 1;

Figure 3 is an elevational end view in cross section, of the depositor employed as a part of the machinery, illustrated in Figures 1 and 2;

Figure 4 is an elevational view in cross section of the depositor shown in Figure 3, and taken on the line 4—4 of Figure 3 and looking in the direction of the arrows.

By referring to the drawings it will be noted that this invention is illustrated as applied to a machine which includes a depositing unit designated generally A, a tray preparing unit B, one end only of which is illustrated, and a novel depositing unit C positioned between units A and B in a manner illustrated in Figures 1 and 2.

It is not deemed necessary to illustrate and describe in detail, the units A and B because these units are of conventional construction and are now in general use and may be identical with those described and illustrated in the Bausman Patent No. 1,169,602 above referred to. In the illustrated form of the invention units A and B as well as the new unit C are driven from a single source of power such as for instance, a pulley wheel 10 which rotates shaft 11. Shaft 11 has a gear 12 mounted thereon which meshes with a second spur gear 13 in turn fixed to shaft 14. By means of spur gears 15 and 16, shaft 14 drives shaft 17 which in turn is coupled to rotate shaft 18 which rotates the elements of a change speed gearing device 19, shown at the extreme left hand side of Figure 1. This speed change device is of conventional design and is the type now employed on this kind of machinery and will not be described other than to point out that it serves to enable the speed of the various parts of unit B to be varied with respect to the speed of the depositing unit A whereby the machine as a whole, may be adapted to produce and fill trays with confectionery having any desired number of transverse rows of recesses or pockets therein all in accordance with the scheme fully described in the Bausman patent referred to.

In machines of this type unit B which prepares the trays, is equipped with a conveyor chain 20 provided with conveying lugs 21 which is driven by a shaft 22 which is rotated by suitable gears 23 and 24 from a shaft 25 which is in turn driven by the variable speed mechanism 19 by gearing elements not illustrated, but clearly shown in the Bausman patent referred to. This gearing is such that the constant rotation of shaft 18 produces an intermittent movement of the shaft 22 whereby the conveyor chain 20 is caused to be advanced a predetermined distance and then stopped to dwell for a period sufficient to permit the various tray preparing operations to be automatically performed.

The trays 30 when prepared with recesses are fed by the conveyor chain 20 and lugs 21 along a suitable track 31 so that they are carried from the end of the unit B across the space between units A and B to a location where they are picked up by the conveyor chain 35 constituting a part of the unit A.

It will be noted that the conveyor chain 20 passes over a pair of sprockets 36 which are loosely mounted on the shaft 37 in the end of the frame of the unit A. Mounted on this same shaft, are other sprockets 38 over which the conveyor chain 35 is positioned. The sprockets 38 are fixed to the shaft 37 whereby the conveyor chains 35 are driven thereby. Any variation in the speed of the two conveyor chains is automatically taken care of by virtue of the fact that sprockets 36 are free to rotate on the shaft 37. This conveyor chain 20 is entirely controlled by the drive established for unit B which is imparted to the chain by means of the sprocket 22.

The conveyor 35 on the unit A is provided with lugs 39 which engage the trays 30 so as to cause them to pass under the depositing mechanism 40 having ejectors 41 and a hopper 42. This depositing mechanism is of usual construction and is too well known to require detailed description in this specification. Furthermore, the mechanism for driving the depositor and the conveyor chain 35 is also well known and fully described in the Bausman patent referred to and does not require explanation here.

It should be understood that the conveyor 20 for unit B is intermittent and moves in between each dwell, a distance equal to the distance of one tray, whereas the conveyor 35 for unit A which is also intermittent, moves a distance equal to the distance between adjacent transverse rows of confectionery receiving recesses or pockets in a single tray and then moves the distance between the last row of one tray and the first row of the next succeeding tray. This conveyor movement is adjustable so that the various transverse rows contained in any particular tray are brought successively under the depositing mechanism 41 to receive a predetermined measured quantity of confectionery therefrom, and when the tray is complete the next tray is moved up with its first row of recesses in proper place under the depositors.

The mechanism thus far described is similar to the corresponding mechanism in the Bausman patent. The added mechanism constituting an improvement in this invention will now be described. By referring to the drawings it will be noted that the unit C constituting the improved depositor of this invention is more clearly shown in Figures 3 and 4 and is illustrated as associated with the conveyor chain 20. In other words, this depositor is associated with that portion of the conveyor which moves intermittently but continuously throughout a distance equal to the distance of one tray. Thus this depositor has its confectionery discharging outlets opened to permit the downward passage of confectionery during the entire period when one tray is passing thereunder so that a plurality of longitudinal streams of confectionery are deposited along the longitudinal rows of confectionery receiving pockets of each tray. The depositor C is so located and so timed that the deposition of confectionery will be commenced at the proper moment to cause the initial deposit to fall into the recesses or pockets constituting the first transverse row of each tray and continue during the movement of the trays until the last portion of the deposit falls into the recesses constituting the last transverse row of each tray. At this moment the depositor automatically shuts off and remains off until the next succeeding tray passes thereunder, at which time the operation is repeated.

As shown in Figures 3 and 4, the depositor here illustrated comprises a hopper 50 adapted to receive the desired quantity of confection. The hopper is preferably equipped with a steam jacket 51 supplied with steam through pipes 52 and 53 whereby a temperature is maintained in the hopper which will assure the proper fluidity of the confectionery contained therein. At the base of the hopper there is provided a removable plate 54 having a plurality of discharge holes 55 therein preferably of conical shape and of predetermined dimension. The conical walls of the discharge holes provide seats for plungers which serve as control valves as hereafter more fully explained. Plate 54 may be removed and replaced by other plates having openings of different sizes so that the flow of confectionery therefrom may be selectively determined to give a stream of the desired size.

The hopper is preferably mounted on a pair of legs 56 supported on frame pieces 57 which extend between the frames of units A and B. The holes 55 in plate 54 are provided in such number and at such spaced intervals as to correspond to the number and spacing of longitudinal rows of confectionery receiving pockets in each tray so that as represented in Figure 4, the confectionery feed holes 55 exactly overlie the rows of holes contained in the trays 30.

At the top of this hopper there are spaced frame parts 58 having bearings 59 therein for mounting the shaft 60. Keyed to the end of shaft 60 is a wheel 61 having a cam slot 62 formed in the inside face thereof in which is adapted to travel, a roller 63. This roller is carried on stub shaft 64 which is rigidly attached to a cross head 65 slidably mounted in the slide guides 66 formed in each frame part 58. Cross head 65 is held against movement away from the cam groove by means of a lug 67 which abuts the edge of the frame part 58 illustrated at the left hand side of Figure 4. The cross head 65 is equipped with a plurality of downwardly projecting plungers 68 which extend through the hopper 50 and are provided at their ends with tapered portions fitting into the openings 55 in the plate 54. These plungers are adjustable upwardly and downwardly in the cross head 65 and are locked by means of nuts 70 at their upper ends.

Provided on one end of shaft 60 is a clutch part 75 which is adapted to mesh with a cooperating clutch part 76 connected for rotation with a sprocket wheel 77 driven by the chain 78. Chain 78 is driven by a sprocket 79 which is rotated by a shaft 80 in turn driven by means of gears 81 and 82 and a shaft 83 from a chain 84, sprocket 85, and drive shaft 18. Shaft 80 is journalled as at 90 in the wall of the hopper 50 and extends therethrough and beyond, projecting out the other end of the hopper. A gear 91 mounted thereon, is in mesh with a second gear 92 keyed to shaft 93 which is likewise journalled in the end walls of the hopper. Shafts 80 and 93 are equipped with blades 94 which constitute agitators for stirring the confectionery in the hopper. This agitation prevents solidification or coagulation which might otherwise interfere with the free flow of the confectionery through the discharge openings 55.

Clutch members 75 and 76 may be movably connected or disconnected by means of a handle 100 pivoted as at 101 to lug 102 carried on the end wall of the hopper. The cross head 65 is preferably equipped with springs 105, connected to a cross pin 106 and mounted on hooks 107 carried by the frame in the manner shown in Figure 4. These springs tend to lift the plungers 68 out of the openings 55 when the cross head is lifted by means of the cam slot 62. Furthermore, shaft 60 is preferably equipped with a hand wheel 110 whereby the mechanism may be moved by hand to a limited extent.

From the above it will be observed that this depositor is much simpler than previous depositors and acts to discharge the confectionery by gravity. The mass of confection is maintained at the proper elevated temperature by means of the steam jacket and in a freely flowing state by means of the agitators so that a flow from the discharge openings is caused by the mere raising of the plungers to an extent sufficient to permit the confectionery to pass out of the restricted openings provided in the base plate 54. The base plate may be removed and replaced by other base plates having openings of different sizes whereby any desired quantity or thickness of stream may be selected according to the particular operation at hand.

It will thus be seen that this depositor functions to deposit confectionery continuously during the passing of the tray thereunder and is so timed through its connecting gearing and the shape of the cam slot 62 that the plungers are lifted at the proper moment to cause the first deposit of confectionery to fall in the first transverse row of tray pockets. Thereafter, the plungers remain lifted during the continued movement of the tray and are shut off at the proper moment to cause the last deposited confectionery to fall into the pockets constituting the last transverse row of pockets. The plungers remain seated during the interval of movement when the conveyor is bringing the next tray into position and the operation is repeated for each successive tray in turn as it passes under the depositor C.

As above pointed out the rate of discharge of confectionery is adjustable by the size of the openings 55 so as to cause any desired thickness of ribbon or rope of confection according to the rate of movement of the tray. Thus any predetermined amount down to very minute quantities of confectionery may be caused to fall into each pocket.

After receiving confectionery from depositor C the trays pass onto unit A where they receive a measured quantity of some additional confectionery from the depositors 41 in the manner now common in the confectionery industry. From depositor A the trays may pass to other depositors to add additional deposits as in the case of production of three colored corn kernels. It is obvious that any number of depositors may be employed according to the nature of the candy being produced but here only one is illustrated.

It will also be apparent that more than one unit C may be employed if desired, and this invention contemplates any desired number and kind of depositors in any desired arrangement, all as may be useful in practicing the teachings of this invention in the production of any commercial confectionery.

I claim:

1. A candy molding machine comprising in combination with confectionery molding trays of starch having recesses therein, a conveyor for said starch trays, means for intermittently advancing said conveyor by movement stages substantially equal to one tray space of said conveyor, a depositor disposed above said conveyor having controllable discharge openings and plungers for feeding streams of confectionery into the recesses of each succeeding tray, and means operable during the period when said trays are moving under said depositor for moving said plungers for causing a continuous feeding of confectionery onto each succeeding tray during the movement under said discharge means of each succeeding tray respectively and also for moving said plungers for stopping the feeding of confectionery during the time when no tray is located under said openings.

2. In combination with trays of starch having confectionery receiving recesses therein arranged in transverse and longitudinal rows, means for advancing said trays at a uniform and predetermined rate, means disposed over said trays having discharge openings overlying the longitudinal rows of recesses in said trays and plungers for closing said openings, and means for operating said plungers for causing a uniform and continuous discharge of confectionery from said discharge openings during the passing of said trays successively from a point where the first transverse row of recesses receives the discharged confectionery to the point where the last transverse row of recesses of each tray respectively, receives the discharge of confectionery.

3. In combination with trays of starch having confectionery receiving recesses therein arranged in transverse and longitudinal rows, means for advancing said trays at a uniform and predetermined rate, means disposed over said trays having discharge openings overlying the longitudinal rows of recesses in said trays and plungers for closing said openings, and means for operating said plungers for causing a uniform and continuous discharge of confectionery from said discharge openings during the passing of said trays successively from a point where the first transverse row of recesses receives the discharged confectionery to the point where the last transverse row of recesses of each tray respectively, receives the discharge of confectionery, said longitudinal rows of recesses being sufficiently close to cause the stream of confectionery to be broken up into its component parts and each part to be substantially completely deposited in its associated recess.

4. In combination with confectionery molding trays of starch having recesses therein, a conveyor for advancing said trays successively, a depositor disposed above said conveyor having a plurality of discharge openings overlying the recesses in said trays, plungers for opening and closing said discharge openings and means for operating said plungers in synchronism with the movement of said conveyor so that said discharge openings are continuously open during the period that the recesses of one tray are passing under said discharge openings, in a position to receive a stream of confectionery therefrom.

5. A candy molding machine comprising in combination with candy molding trays of starch having recesses therein, a pair of conveyors, means connected to a source of power for intermittently driving the first conveyor by movement steps of one tray space of said conveyor and means connected to said source of power for advancing said second conveyor in synchronism with said first conveyor and for the distance between adjacent transverse rows of recesses in said trays respectively, a depositor associated with said first conveyor and a second depositor associated with the second conveyor, means connected to said source of power for actuating said first depositor to cause the deposition of a continuous stream of confectionery onto each tray successively from the first to the last transverse rows of recesses therein and means connected to said source of power for actuating said second depositor for causing the successive deposition of individual charges of confectionery into each recess contained in said trays respectively.

6. A candy molding machine comprising in combination with candy molding trays of starch having transverse and longitudinal rows of recesses therein, a pair of synchronized conveyors disposed in tandem so that the trays may be passed from the first conveyor to the second conveyor, means for continuously advancing said first conveyor at least throughout a distance equal to the distance of the recessed area of one tray and means for intermittently advancing said second conveyor in successive stages equal to the space between adjacent transverse rows of recesses, a confectionery hopper disposed above said first conveyor having a plurality of discharge openings therein and means for opening and closing said openings, means for operating said last named means driven in synchronism with the means for moving said first conveyor which will open said discharge openings during the period that the recesses of each tray pass under said discharge openings, a hopper associated with said second conveyor having discharge means driven in synchronism with the means for moving said second conveyor whereby a segregated charge of confectionery is deposited in each recess of said trays.

WILLIAM MELODY.